United States Patent [19]

Overhouse et al.

[11] Patent Number: 5,309,561
[45] Date of Patent: May 3, 1994

[54] SYNCHRONOUS PROCESSOR UNIT WITH INTERCONNECTED, SEPARATELY CLOCKED PROCESSOR SECTIONS WHICH ARE AUTOMATICALLY SYNCHRONIZED FOR DATA TRANSFER OPERATIONS

[75] Inventors: Leonard E. Overhouse, Los Gatos; Daniel E. Lenoski, Cupertino, both of Calif.

[73] Assignee: Tandem Computers Incorporated, Cupertino, Calif.

[21] Appl. No.: 589,847

[22] Filed: Sep. 28, 1990

[51] Int. Cl.⁵ .............................................. G06F 1/12
[52] U.S. Cl. .................................. 395/200; 395/325; 395/550; 364/270.3; 364/270; 364/DIG. 1
[58] Field of Search ............................... 364/900, 200; 340/825.5; 358/160; 395/200, 325, 550

[56] References Cited

U.S. PATENT DOCUMENTS

| | | | |
|---|---|---|---|
| 4,095,267 | 6/1978 | Morimoto | 364/200 |
| 4,393,464 | 7/1983 | Knapp et al. | 364/900 |
| 4,467,413 | 8/1984 | Dshkhunian et al. | 364/200 |
| 4,473,879 | 9/1984 | Tachiuchi et al. | 364/200 |
| 4,680,779 | 7/1987 | Wakerly | 375/107 |
| 5,133,064 | 7/1992 | Hotta et al. | 395/550 |

FOREIGN PATENT DOCUMENTS

0054243 6/1982 European Pat. Off. .

Primary Examiner—Thomas C. Lee
Assistant Examiner—Michael A. Oblon
Attorney, Agent, or Firm—Townsend and Townsend Khourie and Crew

[57] ABSTRACT

A synchronous processor unit is divided into two sections, and each separately clocked by different clock signals. One section, containing an instruction execution unit and memory for storage of instructions and data, is clocked at a higher frequency, while the other section, containing those elements of a processor unit less frequently used, are clocked with a slower-frequencied clock. The elements of each section are intercoupled by separate and independent data buses, and selectively to one another by a buffer unit. The clock signals used by both sections are produced by a clock-generating unit which also monitors the instructions being executed by the instruction execution unit. When an instruction requiring communication between the two sections is detected, at least one predetermined transition of each of the fast and slow clocks are synchronized, and during this synchronization the separate buses of each section are coupled to one another by the buffer unit for information exchanges therebetween.

10 Claims, 4 Drawing Sheets

SYNCHRONOUS PROCESSOR UNIT WITH INTERCONNECTED, SEPARATELY CLOCKED PROCESSOR SECTIONS WHICH ARE AUTOMATICALLY SYNCHRONIZED FOR DATA TRANSFER OPERATIONS

BACKGROUND OF THE INVENTION

The present invention is directed generally to data processing systems, and in particular to a processor unit having one portion of the logic circuitry clocked at one clock frequency, and another clocked at a different clock frequency.

Many, if not all, processor units in use today are synchronous machines in that operations are performed in synchronous fashion, to the tune of a periodic clock signal ("clock"). Thus, for example, instructions are executed, data transferred, signals generated, in response to transitions from one level to another of the clock.

Typically, all portions of a synchronous processor unit are operated at the same clock speed. However, it is well known that certain processor operations occur much more frequently than other processor operations; in fact, it has been established that as much as 95% of the more frequently occurring operations are often performed, for example, in about 50% of the logic circuitry making up the processor unit. Thus, operation of the processor unit can be enhanced by running that section of the circuitry performing the majority of processor operations with a faster clock, while operating the remainder of the logic circuitry with a slower clock. This allows the slower-run section to be run in a manner that consumes less electrical power, emits less electrical noise, generates less thermal power, necessitating less heat sinking capability, and can be implemented in less expensive technology, and fabricated in less semiconductor area. At the same time, the overall processor speed (i.e., work throughput) is increased.

SUMMARY OF THE INVENTION

According to the present invention, a processor unit is generally divided into two sections, each section separately operated at a different clock frequency. One section, running with a faster clock, preferably contains that circuitry most frequently used in processor operations: An execution unit for executing instructions and performing, for example, various logic and arithmetic functions, and a memory unit for storing instructions and data. The second section, running with a slower clock, includes those circuit elements that are subject to relatively less frequent use in processor operation, such as those typically associated with handling external communications for the processor unit. Two data buses, one for each section, are provided for communicating information (e.g., instructions, commands, and data) between the section elements. One, a main data bus, communicates information between the elements of the faster clock section containing the execution unit and memory, and an extended data bus that communicates the circuit elements of the second slower clock section of the processor unit to one another. A buffer mechanism selectively couples the main data bus and the extended data bus to one another for selectively permitting information exchanges between the two sections.

A clock generator provides independent "fast" and "slow" clocks for the two sections, respectively. The clock generator includes detection logic that monitors the instructions being executed by the execution unit. Detection, by the clock generator detection logic, of those instructions that require information to be communicated between the two sections will cause the clock generator to synchronize the fast and slow clocks, and enable the mechanism buffer to permit a synchronized information communication between the two sections on the main data bus and the extended data bus.

A number of advantages are achieved by the present invention. First, using two or more different clock signals permits certain portions of the processor unit to be operated at a higher speed than other portions. The slower-operated portions can, thereby, be treated differently in light of the fact that they consume less power, require less heat sinking, and are subject to less stringent design requirements. The slower clock components can be implemented in less expensive circuitry in smaller semiconductor areas. Slower operation will also result in reduced electromagnetic interference generation.

Further, the invention permits existing processor designs to be easily modified so that sections of the design can operate at different clock speeds without undue and expensive modifications. Thereby, the work throughput of an existing processor design may be increased without the necessity of substantial redesign.

These and other features and advantages of the invention will become apparent to those skilled in the art upon a reading of the following detailed description, which should be taken in conjunction with the accompanying drawings.

DETAILED DESCRIPTION OF THE INVENTION

Figure 1:
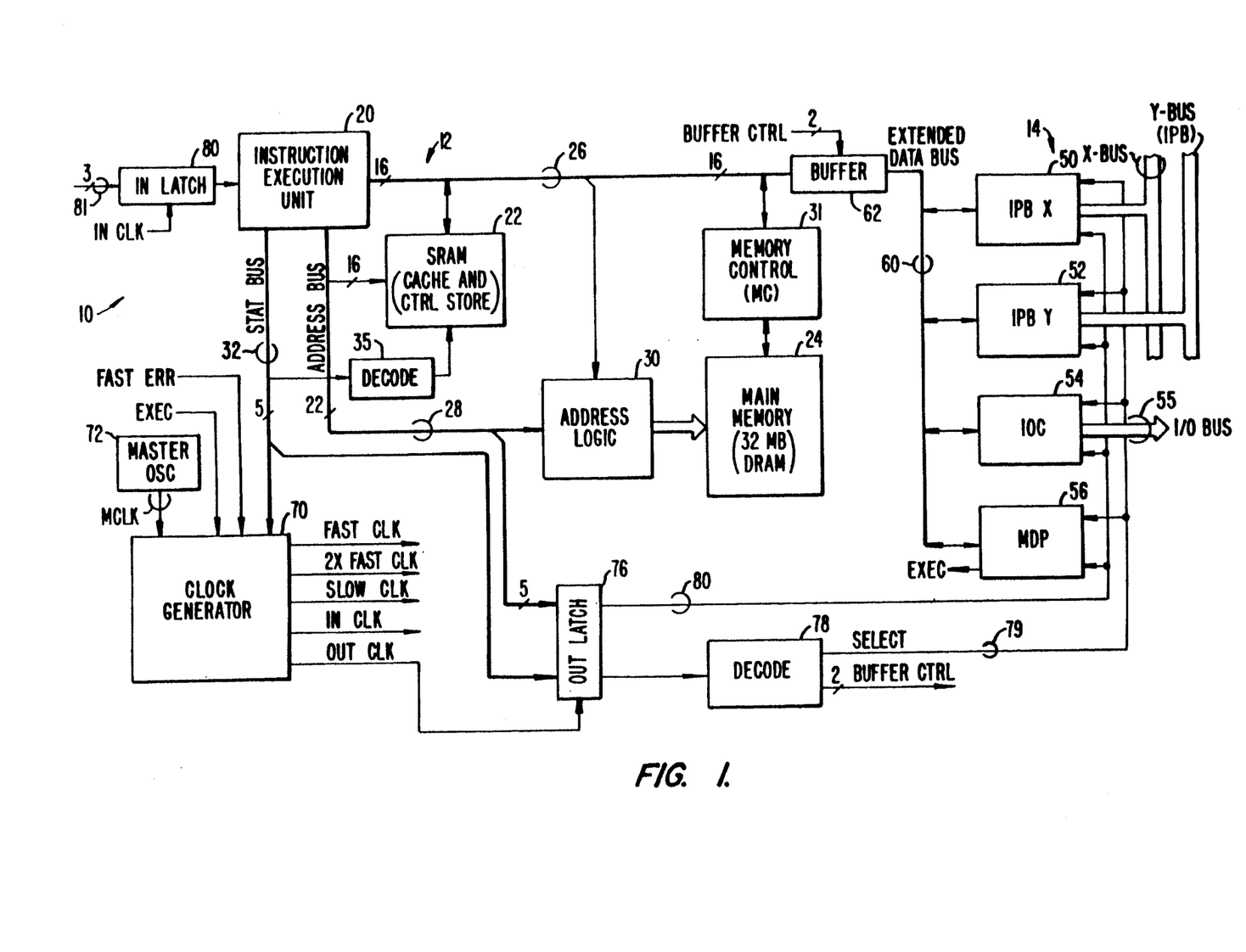
FIG. 1 is simplified block diagram of a processor unit, divided into two sections, incorporating the present invention.

Turning now to the drawings, and in particular FIG. 1, there is illustrated a processor unit, designated generally with the reference numeral 10, constructed according to the teachings of the present invention. As illustrated, the various circuit elements of the processor unit 10 are divided into two sections, preferably, according to usage in processor operations: A "fast" section 12, containing those elements most often used in processor operations, and a "slow" section 14, containing circuit elements enjoying relatively less frequent use. As will be seen, a defining characteristic of the fast and slow sections 12, 14 is the frequency of the clock signals used to operate the respective sections. As the labels indicate, the fast section 12 will be operated with clock signals having a frequency higher than those used to operate the circuitry forming the slow section 14.

Continuing, the fast section 12 includes an instruction execution unit 20 coupled to memory circuits, comprising a cache memory 22 and a 32 megabyte main memory 24, by a main data bus 26 and an address bus 28. The cache memory 22 functions as the control store for the instruction execution unit 20, containing the control instructions, as well as data, that effect operation of the instruction execution unit 20.

The instruction execution unit 20 is of generally conventional design in that it operates in response to central instructions accessed from the cache 22 to perform the various arithmetic, logic and control functions necessary for the processor unit 10 to operate as a processor. In fact, except for those circuit elements incorporated in the processor unit 10 to form the present invention, the processor unit itself is of conventional design.

The main memory 24 includes address logic 30 that develops the addresses for memory access from information communicated on the main data bus 26 and the address bus 28. A memory control unit (MCU) 31 produces the signals necessary for access (e.g., read or write) with appropriate timing. Preferably, the main memory 24 is a dynamic random access memory (DRAM). Thus, MCU 31 will also produce the required refresh signals. Typically it is the cache memory 22 that is more often accessed, also via addresses communicated on the address bus 28.

Information as to the type of instruction being executed by the instruction execution unit 20 is produced and carried on a status (STAT) bus 32 in the form of a 4-bit nibble plus parity. Although not specifically shown, the information on the STAT bus is used by the cache memory 22, via a decode circuit 34, to determine when an access will be made of the cache memory 22, and the type of information that will be accessed (e.g., control instruction, data, etc.).

As indicated above, the slow section 14 preferably encompasses those elements of the processor unit 10 that are subject to less frequent use during processor operation, such as input/output operations. The present invention is designed for use in a multi-processor configuration in which processor-to-processor communications are conducted on redundant inter-processor buses. An illustration of such a multi-processor system can be found in U.S. Pat. No. 4,228,496 or 4,888,684. The processor unit 10, therefore, includes logic for interfacing with each of the interprocessor buses (IPBs) X and Y in the form of IPB interface units 50 and 52.

For communication between the processor unit 10 and various peripheral units, such as additional storage in the form of magnetic disk and/or tape, printers, terminals and the like, an input/output channel (IOC) 54 connects the processor unit 10 to an I/O bus 55.

Also included in the slow section 14 is a maintenance diagnostic processor MDP 56. MDP 56 is a separate, specialpurpose processor unit responsible for handling various maintenance/diagnostic functions to ensure the credibility of the processor unit 10. Most functions, with one exception, performed by the MDP 56 are not relevant to the present invention. That exception is the assertion of EXEC signal which, when received at multiple locations within the processor unit 10, enables operation of the processor unit.

The individual elements of the slow section 14, i.e., the IPBs 50, 52, the IOC 54, and the MDP 56, are coupled to one another for communication by an extended data bus 60. The elements of the slow section 14 typically do not communicate with one another, with one exception: On every slow clock cycle unused for communication between the fast and slow section 12, 14, one of the units 50-56 will transmit a data word on the extended data bus 60 for receipt by the other units. Data words transmitted on the extended data bus 60 (as well as the main data bus 26) are each accompanied by parity for error checking purposes. For this reason, the units of the slow section 14 communicate with one another, solely for error checking. Information transfers are conducted between the fast section 12 (i.e.., the execution unit 20) and the elements of the slow section 14. For this purpose the extended data bus 60 is coupled to the main data bus 26 by a tri-state buffer unit 62 that is controlled by a 2-bit buffer control (BUFFER CTRL) signal. When BUFFER CTRL is asserted, the two data buses 26, 60 are electronically coupled to one another for communicating information from one to the other of the main and extended data buses 26, 60. BUFFER CTRL will also identify the direction of communication (e.g., from the fast section 12 to the slow section 14). When the BUFFER CTRL signal is not asserted, the amine data bus 26 is effectively decoupled from the extended data bus 60 so that information flow on the extended data bus 60 will not interfere with that on the main data bus 26, and vice versa, when the two sections are operating independently.

According to the present invention, fast and slow sections 12, 14 are clocked by clock signals having different frequencies. It is only when information is to be passed between the two separate sections that synchronization between the clocks must be affected, and the data buses 26 and 60 intercoupled.

The clock signals used by each section are produced by a clock generator 70 that operates in response to a periodic, 15-nanosecond master clock signal (MCLK) produced by a master osicllator 72. The clock generator 70 produces, from MCLK, those clocking signals necessary for synchronous operation of the elements of the fast section 12 and the slow section 14. The major clock are FAST CLK and 2XFAST CLK for the fast section 12, and SLOW CLK for the slow section 14. The IN CLK and OUT CLK signals are used to latch status information in the in-latch 80 synchronous to operation of the instruction execution unit 20, as will be described below. Similarly, the OUT CLK signal provided by the clock generator 70 operates to synchronously (relative to the slow section 14) load the out-latch 76 with address and control information.

The preferred embodiment of the invention has a ratio of 3:2 for the frequencies of FAST CLK to SLOW CLK, although it should be evident that other ratios may be used. The FAST CLK signal is used for synchronous operation of the instruction execution unit 20, as well as other circuitry of the fast section 12, including operation of the cache and main memories 22 and 24 and associated circuitry. The 2XFAST CLK signal is used by the MCU 31 for various timing purposes.

The SLOW CLK is used for effecting synchronous operation of the elements of the slow section 14.

Digressing for a moment, synchronous operation of processor units, such as processor unit 10 (not implementing the features of the present invention) typically have state changes on one or another of the transitions between the LOW and HIGH levels of a periodic clock signal. For example, in prior conventional designs not utilizing the teachings of the present invention, data would be transferred from the instruction execution unit 20 to the IOC by the same clock signal, and relative to the same transition (e.g., LOW to HIGH) of that clock signal. A synchronous transfers (between synchronously operated units) may be effected in a manner that obviates the need for the information transfer to occur relative to a specified clock transition, but this requires the logic to be specifically designed for such transfers, and it is a slower technique.

Unless otherwise specified, it should be understood that the major (clocked) elements of the processor 10 will change state on the LOW to HIGH transition ("rising edge") of FAST CLK (for those elements of the fast section 12), or SLOW CLK (for those elements of the slow section 14). Thus, in order for there to be a synchronous transfer of information between the fast and slow sections 12, 14, via the respective main and extended data buses 26, 60, the transfer operation (e.g., assertion of the information on the bus, accepting the information from the bus, etc.) must be conducted relative to the same rising edge. For example, assume data is to be transferred from the fast section 12 to the slow section 14 via the main and extended data buses 26, 60. The instruction that will effect that transfer begins execution (an instruction cycle) in the instruction execution unit 20 with the rising edge of FAST CLK. During that instruction cycle the data will be placed on the main/extended data bus 26/60. That data must be accepted by the slow section 12 before (or with) the next successive rising edge of FAST CLK before the next instruction cycle (initiated with the next successive rising edge of FAST CLK) will take over the main data bus 26.

Figure 4:
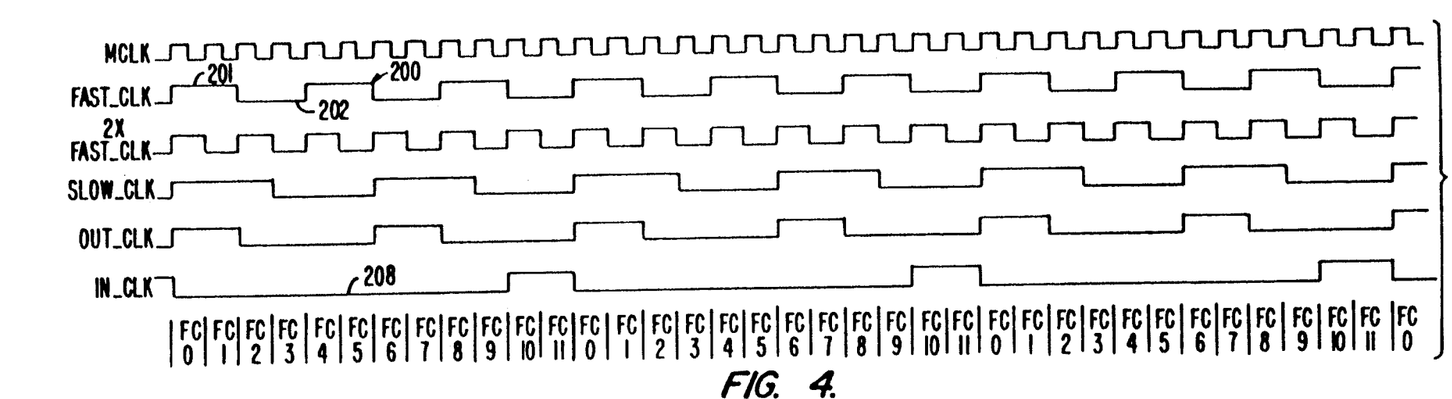
FIGS. 4 and 5 are timing diagrams illustrating operation of the clock generation logic to form the various clocks used to implement the present invention.

Since there is a 3:2 ratio between the FAST CLK and SLOW CLK signals, rising edges of those two signals may not coincide when needed (e.g., see FIG. 4). Thus, the FAST CLK and SLOW CLK signals must be "synchronized;" that is, rising edges of the two signals must be made to coincide when a communication of information is to occur between the two sections 12 and 14. This, as will be seen, is the function of the clock generator 70.

Information transfers between the fast and slow sections 12, 14 of the processor unit 10 are not limited to utilizing the main and extended data buses 26, 60. Selection and control information is communicated from the fast section 12 to the slow section 14 via the out latch 76. Thus, a 5-bit portion of the address bus 28, and the information appearing on the STAT bus 32, are communicated to the slow section 14 via the out latch 76. The STAT information is latched in the out latch 76 with OUT CLK, from which it is passed to a decode unit 78. The decode unit 78 operates to produce the BUFFER CTRL signals that control the buffer 62 as well as the SELECT signal, carried by signal lines 79, for enabling one of the slow section functional units 50, . . . , 56. The address information is conducted from the out latch 76 by a bus 80 to the elements of the slow section 14, identifying the function to be performed by the selected unit when it is placed in communication with the instruction execution unit 20.

Further, every information transfer cycle between the fast and slow sections 12, 14 on the main and extended data buses 26, 60 invokes a return of status information from the selected unit. This return status information is communicated on three signal lines 81 from the slow section 14 to the fast section 12 via a 3-bit in-latch 80, and latched therein by the IN CLK which is synchronized to the SLOW CLK. The IN CLK, as will be explained more fully below, is present only when the FAST CLK and SLOW CLK signals are synchronized.

Figure 2A:
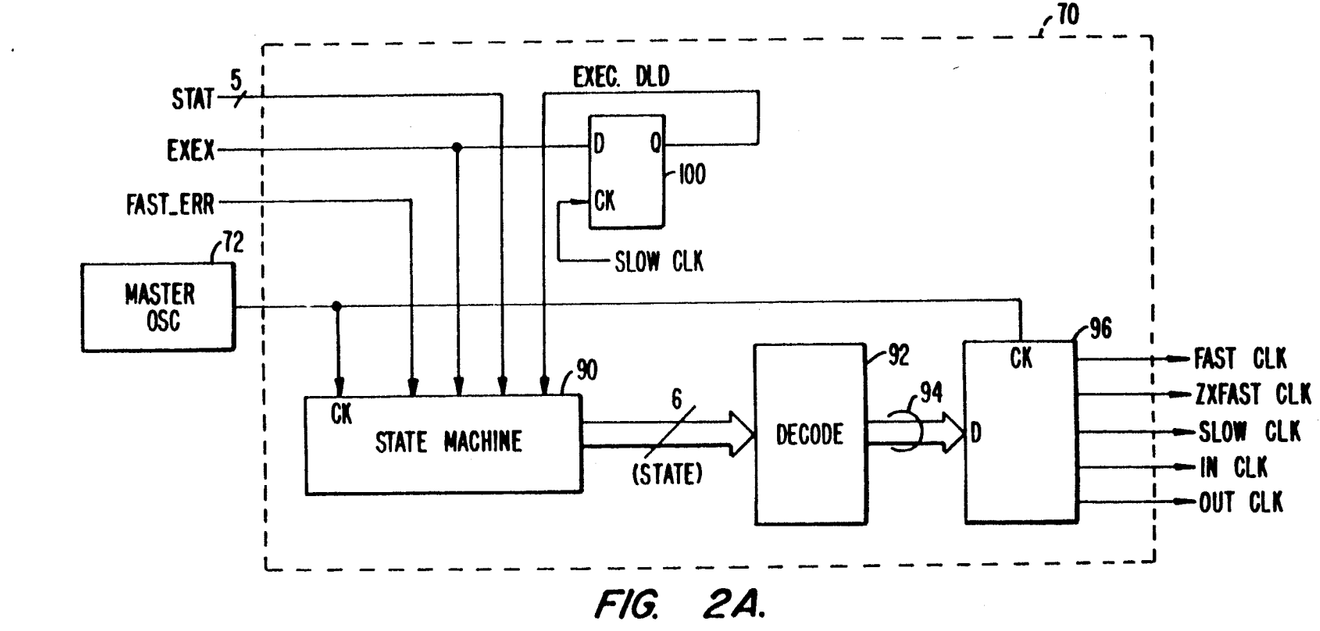
FIG. 2A is a block diagram of the clock generator logic used to implement the present invention in FIG. 1.
Figure 3:
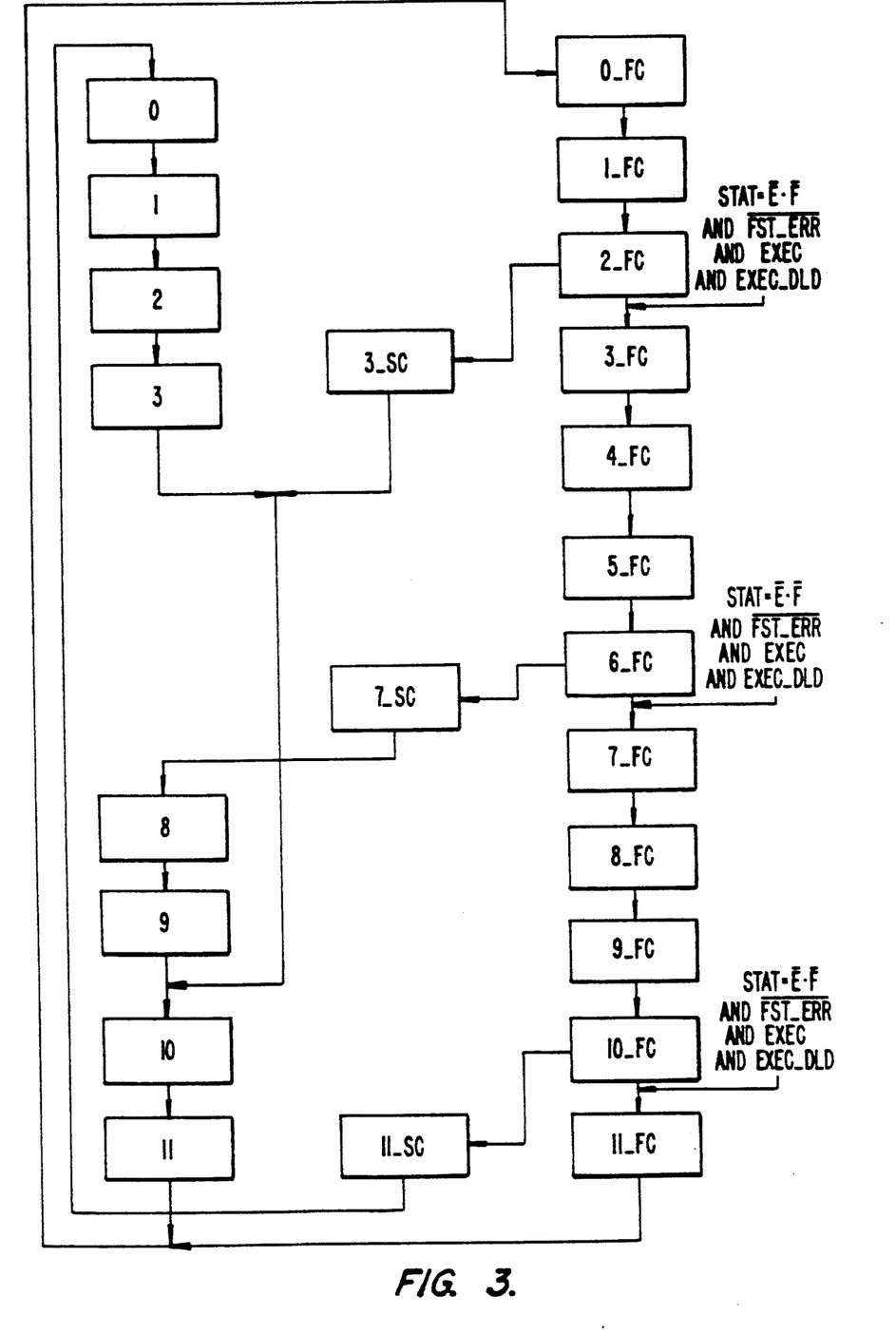
FIG. 3 is the state diagram of the state machine used to implement the clock generator logic shown in FIGS. 1 and 2, illustrating the state transitions for synchronizing the clock signals of the two sections of the processor unit of FIG. 1.
Figure 5:
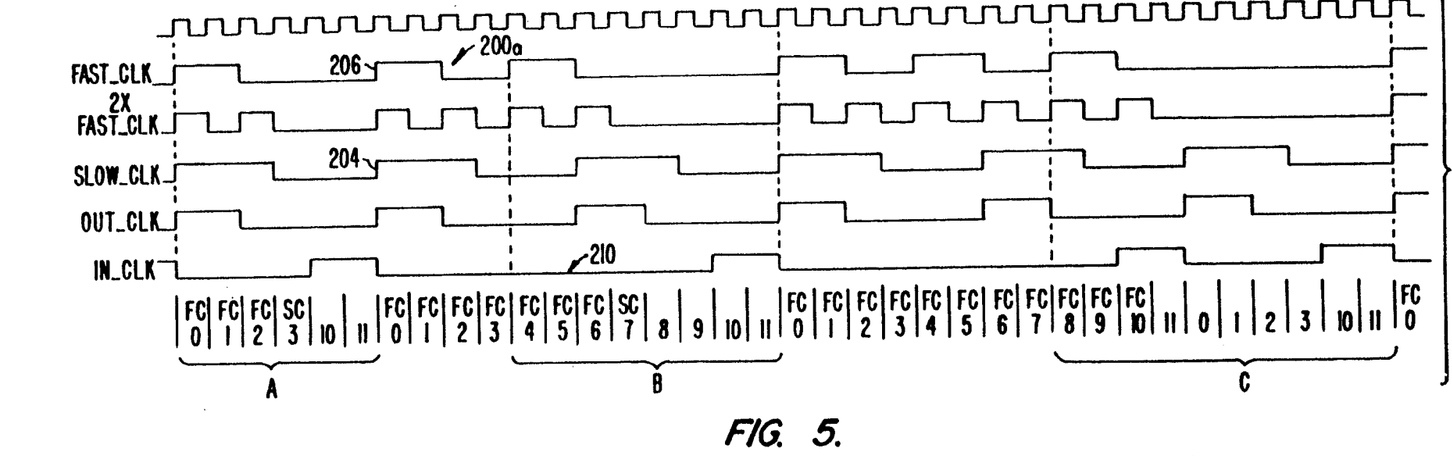

Turning now to FIG. 2A of the drawings, the clock generator 70 is illustrated in greater detail in block diagram form. As shown, the clock generator 70 includes a state machine 90 that cycles through various states, dependent upon input signals FAST_ERR, EXEC, STAT, and a delayed version of EXEC, EXEC_DLD. The state machine 90 is responsible for synchronizing the FAST CLK and SLOW CLK signals when information is to be transferred between the fast and slow sections of the processor unit 10 via the main and extended data buses 26, 60. A state diagram for the state machine 90 is shown in FIG. 3. FIG. 4 illustrates the various waveforms produced by the clock generator 70 when no synchronization between FAST CLK and SLOW CLK is needed. FIG. 5 illustrates the three unique waveform patterns (i.e., the three forms of synchronization that can occur—labeled A, B and C in FIG. 5) that are formed by the clock generator 70 when transitions of the FAST CLK and SLOW CLK signals are matched for synchronization.

With continued reference to FIG. 2A, in addition to the state machine 90, the clock generator 70 includes a state decode logic 92 that receives the 6-bit output from the state machine 90, defining each state entered by the state machine. State decode logic 92, in turn, produces, for each state assumed, the proper level for each of the signals generated by the clock generator 70.

Output lines 94 of the state decode logic 92, each of which carries one of the clock signals generated by the clock generator 70 (e.g., FAST CLK, IN CLK, etc.) are each applied to a respective input of a D-type flip-flop, cumulatively represented in FIG. 2A at 96. Each of the D-type flip-flops is clocked by the master clock signal (MCLK) produced by the master oscillator 72.

The state machine 90 will change state upon each rising transition of MCLK. As a result, the various stages of the state machine 90 most likely will change at different rates, causing the corresponding outputs of the state machine to change levels at different times. In turn, the state decode logic 92 will most likely produce multiple transitions between HI and LOW levels before settling to a signal state representative of the proper state of the state machine 90. This is the reason for the D-type flip-flops 96: To mask these transitions during each change of state machine 90. In effect, use of the D-type flip-flops will delay, for one period of the MCLK signal, the actual state change, as it results in the signals produced by the clock generator 70.

Continuing with FIG. 2A, the clock generator 70 includes a D-type flip-flop 100 that is used to develop a delayed, synchronized version of the EXEC signal for diagnostic purposes. The EXEC signal is applied to the data (D) input of the flip-flop 100, and the SLOW CLK signal is applied to the clock (CK) input. The output (Q) of the flip-flop 100 produces the EXEC_DLD signal.

The EXEC signal is produced by the MDP 56 (FIG. 1) and, in effect is an enable signal that enables operation of the processor unit 10 when asserted. When not asserted, the processor unit 10 is disabled. EXEC is synchronized to the SLOW CLK signal, and is asserted/de-asserted for simultaneous start/stop of all elements of the processor unit 10 so that operation begins or ends in a consistent manner.

Figure 2B:
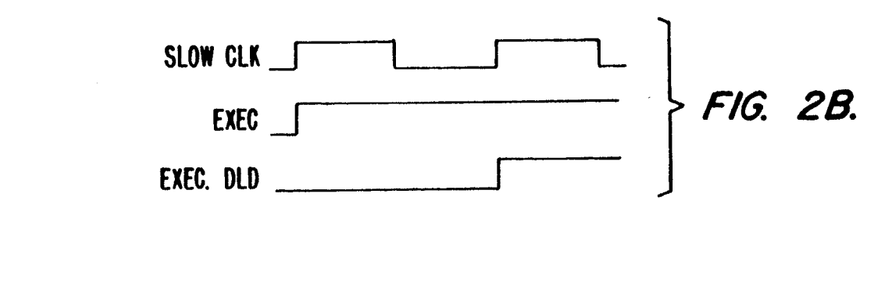
FIG. 2B is a simplified timing diagram illustrating operation of a portion of the clock generation logic of FIG. 2A.

The EXEC_DLD signal is used for single-stepping the processor unit 10. Thus, the first instruction cycle following assertion of EXEC will always be a synchronized slow cycle—independent of the value carried by the STAT bus 32. The timing diagram of FIG. 2B shows the relationship between EXEC and EXEC_DLD relative to SLOW CLK.

FIG. 3 illustrates the states assumed by the state machine 90 to produce the various signals shown in FIG. 1, including versions of FAST CLK synchronized (i.e., a LOW to HI transition aligned) with a rising edge of SLOW CLK. When there is no data bus information transfer between the fast and slow sections 12, 14, the state machine 90 will sequence through only those states labeled 0_FC, 1_FC, ... 11_FC to produce the various waveforms shown in FIG. 4. The states assumed by the state machine 90 are identified along the bottom of FIG. 4, and correspond to the states labeled in FIG. 3. As an example, the first HIGH portion 201 of the FAST CLK waveform 200 is produced by the states 0_FC, 1_FC; the immediately following LOW portion 202 of the waveform is derived from the states 2_FC, 3_FC. In similar fashion the next two successive periods of FAST CLK are produced by the states 4_FC-7_FC and 8_FC-11_FC. The state machine 90 returns to state 0_FC to begin over again. Each of the states 0_FC, ..., 11_FC, as well as the other states illustrated in FIG. 3, are assumed for a 15 nanosecond period, the period of the MCLK produced by the master oscillator 72.

A FAST CLK period is developed from four MCLK periods. Instructions are executed one per FAST CLK cycle. FIG. 3 exhibits this relationship: The twelve states 0_FC, ..., 11_FC assumed by the state machine 90 represent execution of three instructions. Thus, when the fast section 12 is operating only in the fast mode (i.e., no synchronization with the slow section 14 is required), an instruction is executed in each of the three instruction execution cycles defined by the states 0_FC-3_FC, 4_FC-7 FC_and 8_FC-11_FC.

Each instruction execution cycle is entered assuming that it will be completed within four sequential state transitions of the state machine 90. This is a correct assumption if the FAST CLK and SLOW CLK signals do not require synchronization. If, however, the two signals require synchronization, completion of FAST CLK will require more than four states. It is during the third state of each fast clock instruction cycle (i.e., the states 2_FC, 6_FC, and 10_FC) that a determination is made of whether the instruction being executed by the instruction execution unit 20 will require an information transfer between the fast and slow sections 12, 14—necessitating synchronization. The execution cycle will continue along the path of normal FAST CLK generation as long as the value in hexadecimal (hex) of the four bits carried by the STAT bus 32 is not an E or an F, and the FAST_ERR signal is not asserted, and the EXEC and EXEC_DLD are TRUE. If, however, an information transfer is to be made between the fast and slow sections 12, 14, rising edges of the FAST CLK and SLOW CLK signals must be aligned, i.e., the two must be synchronized. Such a transfer will be indicated by a value of E or F (hex) on the STAT bus 32.

As will be seen, only the FAST CLK is modified to achieve the synchronization between FAST CLK and SLOW CLK. The rising edge of FAST CLK will be delayed, relative to the immediately preceding falling edge, by an amount of time dependent upon which of the three instruction execution cycles will call for synchronization; e.g., during of the states 2_FC, 6_FC, or 10_FC it is determined that the instruction being then executed will require an information transfer between the fast and slow sections 12, 14. The SLOW CLK signal is not modified for synchronization.

Thus, if the determination is made during the state 2_FC that synchronization is required, the state machine will traverse from state 2_FC to 3_SC, rather than as would be normal (when synchronization is not required) to the state 3_FC. From there, (i.e., state 3_SC), the state machine 90 will pass through idle states 10 and 11, during which the level of FAST CLK is held LOW, returning to the 0_FC state to produce the next occurring rising edge 206 (FIG. 5) of the FAST CLK waveform 200a. Note, as FIG. 5 indicates that the rising edge 204 of SLOW CLK coincides with the rising edge 206 of FAST CLK. Without the travel of the state machine 90 through the addition states 3_SC, 10, and 11, the rising edge would have occurred during the fast clock state 4_FC, approximately 30 nanoseconds (two MCLK periods) before that of SLOW CLK (see FIG. 4). Note also that 2XFAST CLK is also modified to align the rising transition of that signal with rising transitions of both SLOW CLK and FAST CLK.

Similarly, if the determination is made by the state machine 90 that the instruction being executed during the instruction cycle of fast clock states 4_FC-7_FC is made, the third, state, 6_FC, of that execution cycle will be followed by the delay states 7_SC, 8, 9, 10 and 11 (i.e., waveform pattern B, FIG. 5), as FIG. 3 indicates. Note that there are two additional states, 8 and 9, traversed, when compared to the delay added to the execution cycle of 0_FC-3_FC. This is the result, again, of the phase relationships between the FAST CLK and SLOW CLK signals that exist at the time the determination is made. Similarly, the longest delay for synchronization of rising edges of the FAST CLK and SLOW CLK signals are produced if the determination for the necessity of synchronization is made during the state (10_FC). The state machine 90 then passes through the states 11_SC, 0, 1, 2, 3, 10 and 11, as indicated in FIG. 3 (and FIG. 5—waveform pattern C).

Selection of the synchronization path depends upon the state of several signals applied to the state machine 90, as indicated in FIG. 3. First, is the information carried by the STAT bus 32. If the instruction execution unit 20 is executing an instruction that will use the extended data bus 60, the state of the STAT bus 32 will be an E or an F (hex). If it is anything else, the next state assumed by the state machine 90 will be 3_FC, 7_FC, or 11_FC (assuming the other signals, discussed below, permit this change).

EXEC, as explained above, enables operation of the processor unit. If EXEC is LOW, the processor unit 10 is disabled and not operating. This does not mean, however, that clock signals need not be generated. The main memory, for example, will need to maintain its refresh cycle. Thus, even though the processor is disabled, with EXEC not asserted, the FAST CLK signal continues, but developed from the slow cycle loop of states 0_FC, 1_FC, 2_FC, 3_SC, 10 and 11.

The processor unit 10 contains, in both the fast and slow sections 12 and 14, circuitry (not shown) that will monitor various operating parameters. If this circuitry detects an error, an error flag of one sort or another will be raised. When such error detection occurs, it is desirable to halt operation of the processor unit. In the case of the present invention, it is desirable to halt the fast and slow sections 12, 14 at the same time, i.e., on the same rising edge. Thus, when one of the error conditions occur within the fast section 12, the FAST_ERR signal will be asserted to halt operation of the processor unit 10. When asserted, the FAST_ERR signal will cause the state machine 90 to take one of the synchronization paths, so that when the rising edges of FAST CLK and SLOW CLK coincide, EXEC can be dropped, thereby halting both sections at the same time.

Many of today's data processing systems are designed to include circuitry for diagnostic operation, and the processor unit 10 is no exception. One such diagnostic is the ability to perform single-step operation; that is, to let the instruction execution unit 20 execute one instruction and then to stop operation. To do this, the MDP 56 will raise the EXEC signal for one execution cycle, and bring it down at the completion of that cycle. Since EXEC was LOW prior to its assertion, its derivative, EXEC_DLD, developed by the flip-flop 100, will also be LOW. The purpose of the delayed version of EXEC, EXEC_DLD, is to ensure that the single-step operation of the fast section 12 will be a slow cycle and terminate with that of the slow section. Thus, when EXEC is raised (with the rising edge of SLOW CLK, since the MDP is clocked by SLOW CLK), the fact that EXEC_DLD is LOW will ensure that a desired slow cycle is taken. When the single-step operation is completed, the MDP 56 will bring down EXEC and the state machine will remain locked into a slow cycle routine (e.g., for memory refresh operation, as explained above) until EXEC is again asserted.

Returning for the moment to FIG. 1, note that the IN CLK signal operates the in-latch 80 to temporarily store three bits of information (e.g., interrupts, status, and the like) communicated from the slow section 14. As mentioned above, the latching operation is synchronized to operation of the execution unit 20, i.e., to the FAST CLK signal. Accordingly, as illustrated in FIGS. 4 and 5 by the waveforms 208 and 210, the IN CLK signal is produced by (1) the idle states 10 and 11, (2) the fast clock states 10_FC and 11_FC, or (3) the fast clock state 10_FC and the initial synchronizing state 11_SC. Latches used in the design of the present invention are levelsensitive, and are of the type in which the outputs follow the inputs while the control signal is HIGH; and the input is latched when the control signal goes LOW. Since it is obviously undesirable to have the output of a latch changing state when it is attempted to be read, the need for synchronizing the in-latch 80 to operation of the instruction execution unit 20 is evident. Thus, the IN CLK signal is produced, relative to FAST CLK, so that data will be held steady in the in-latch 80 a sufficient set-up time for the destination circuits (e.g., instruction execution 20).

In similar fashion, the out latch 76 is synchronized to the operation of the elements of the slow section 14. When there is no synchronizing activity between the FAST CLK and SLOW CLK signals, the OUT CLK is produced by the fast clock states 0_FC-1_FC and 6_FC-7_FC. Depending upon the synchronization cycle assumed, the OUT CLK signal will also be produced by the states 6FC-7_SC and the idle states 0-1. The information carried by the address and STAT buses 28, 32 will change on the rising edge (LOW to HIGH transition) of FAST CLK. But the slow section 14 elements, being edge-triggered devices (as are most elements of the fast section 12) accept the information on the rising edge of SLOW CLK. Thus, OUT CLK holds the data in the out-latch 76 steady to allow it to set up for rising edges of SLOW CLK; thereafter, OUT CLK goes HIGH, permitting the output of the out-latch 76 to follow the input. See FIG. 5.

What is claimed is:

1. A synchronous data processor having separately clocked multiple processing sections, comprising:

a first processing section synchronously operable to execute instructions in response to a first clock signal for performing at least arithmetic and logic operations, the first processing section including a first bus means for communication digital information;

a second processing second that operates in response to a second clock signal different from the first clock signal, the second processing section including a second bus means for communicating digital information;

circuit means coupling the first bus means and the second bus means to one another for communication of digital information, the instructions including data transfer instructions that when executed by the first processing section, effect communication of digital information between the first and second bus means; and clock generating means for generating the first and second clock signals, the clock generating being operable in a first mode to produce the first and second clock signals with frequencies different from one another, and in a second mode for producing the first locks with at lest one predetermined state transition synchronized with a state transition of the second block signal;

the clock generating means including means coupled to detect the data transfer instructions being executed by the first processing section to switch the clock generating means from the first mode of operation to the second mode of operation to synchronize the one predetermined state transition of the first clock with the state transition of the second block during the communication of digital information between the first and second bus means.

2. The data processor of claim 1, wherin the first processing section includes memory means, coupled to the first bus means, for storing instructions and data.

3. The data processor of claim 1, wherein the second processing section includes input/output means, coupled to the second bus means, for communication with devices external to the data processor.

4. The apparatus of claim 1, wherein the data processor includes means for coupling the first and second data buses to one another when the clock generating means is in the second mode.

5. The data processor of claim 1, including circuit means coupling the first bus means and the second bus means to one another, the circuit means being responsive to the first processor section to communicate the first bus means and the second bus means to one another when the first processing section is executing a data transfer instruction and the one predetermined state transition of the first clock is synchronized with the state transition of the second clock.

6. The data processor of claim 5, wherein the circuit means inhibits communication between the first bus means and the second bus means when the first processing section is not executing a data transfer instruction.

7. In a data processor of the type formed with a first data processing circuit group including a main bus means and a second data processing circuit group including an extended bus means, coupled together through said respective bus means for communicating information thereon, the first data processing circuit group including an instruction executing means for executing instructions to perform data processing operations, the instructions including data transfer instructions for transferring information between the first and second data processing circuit groups, apparatus for providing first and second clocks, each of a different frequency from the other, for synchronizing one transition of the first clock and with one transition of the second clock when a data transfer instruction is being executed by the instruction executing means, the apparatus comprising:

clock generating means for providing the first and second clocks, the clock generating means including means coupled to receive an indicia of the instruction being executed by the instruction execution mean and responsive thereto to effect substantial coincidence between a predetermined transition of the first and second clock signals when the instruction execution means is executing a data transfer instruction; and detecting means coupled to the instruction execution means to receive the indicia of the instruction being executed to communicate the main and extended data buses to one another for a time period that includes the coincidence in transitions of the first and second clock signals when the instruction execution means is executing a data transfer instruction.

8. The apparatus of claim 7, wherein the first data processing circuit group includes memory means for storing the instructions and data.

9. The apparatus of claim 7, wherein the second data processing circuit group includes input/output control means for communicating data between the data processor and one or more peripheral devices.

10. A data processor, comprising:

a first processing section operating in response to a first clock signal and including first circuit means for performing at least arithmetic, logic, and data transfer operations in response to instructions, including data transfer instructions, memory means for storing data and the instructions, the first bus means inter-coupling the first circuit means and the memory means for communicating digital information therebetween when the first processing section is executing data transfer instructions;

a second processing section operating in response to a second clock signal, the frequency of the second clock signal being different from that of the first clock signal, the second processing section including a second bus means;

clock generating means operable in a one mode for generating first and second clock signals, and in a momentary mode in which at least one transition of the first clock signal and one transition of the second clock signal occur substantially at the same moment in time, the clock generating means including means coupled to detect data transfer instructions being executed by the first circuit means to operate the clock generating means in the momentary mode; and means coupling the first bus means to the second bus means and responsive to the first circuit means executing a data transfer instruction to communicate the first and second buses to one another for a period of time that includes the moment in time, and to prohibit communication between the first and second buses at all other times;

* * * * *